United States Patent [19]
Segal et al.

[11] Patent Number: 6,095,439
[45] Date of Patent: Aug. 1, 2000

[54] CORNER IRRIGATION SYSTEM INCLUDING A GPS GUIDANCE SYSTEM

[75] Inventors: Vince G. Segal, Fargo, N. Dak.; John A. Chapman, Wahoo, Nebr.

[73] Assignee: Valmont Industries, Inc., Valley, Nebr.

[21] Appl. No.: 09/203,706

[22] Filed: Dec. 2, 1998

[51] Int. Cl.[7] ....................................................... B05B 3/12
[52] U.S. Cl. ........................... 239/729; 239/69; 701/50; 701/215
[58] Field of Search ............................ 239/726, 728–733, 239/743, 744, 69, DIG. 15; 364/142, 147; 701/50, 213, 215; 180/204, 168, 400, 401

[56] References Cited

U.S. PATENT DOCUMENTS

| | | | |
|---|---|---|---|
| 3,802,627 | 4/1974 | Seckler et al. | 239/729 |
| 4,011,990 | 3/1977 | Meis et al. | 239/729 X |
| 4,340,183 | 7/1982 | Kegel et al. | 239/729 X |
| 4,569,481 | 2/1986 | Davis et al. | 239/729 X |
| 4,790,402 | 12/1988 | Field et al. | 180/169 |
| 5,155,684 | 10/1992 | Burke et al. | 364/424.02 |
| 5,334,987 | 8/1994 | Teach | 342/357 |
| 5,610,815 | 3/1997 | Gudat et al. | 364/424.027 |
| 5,653,389 | 8/1997 | Henderson et al. | 239/69 |
| 5,657,226 | 8/1997 | Shin et al. | 364/424.027 |
| 5,870,686 | 2/1999 | Monson | 701/50 |
| 5,904,296 | 5/1999 | Doherty et al. | 239/69 |
| 5,919,242 | 7/1999 | Greatline et al. | 701/50 |
| 5,927,603 | 7/1999 | McNabb | 239/69 X |
| 5,955,973 | 9/1999 | Anderson | 701/215 X |

OTHER PUBLICATIONS

"Performance of Nondifferential GPS to Determine Sprinkler Position", Gerald W. Buchleiter, et al., 1998.

*Primary Examiner*—Andres Kashnikow
*Assistant Examiner*—Steven J Ganey
*Attorney, Agent, or Firm*—Zarley, McKee, Thomte Voorhees & Sease; Dennis L. Thomte

[57] ABSTRACT

A self-propelled irrigation machine including an elongated main boom pivoted at one end to a center pivot and supported on a plurality of self-propelled, non-steerable drive towers. An extension boom is pivotally secured to the other end of the main boom for irrigating corner areas of the field. A steerable drive tower supports the extension boom and includes a pair of steerable drive wheels. The guidance and control for the extension boom utilizes GPS receivers as position sensors. The system is comprised of two GPS units, two microprocessor based smart boxes, a communications link running from the pivot to the steerable drive unit, and an angle sensor to monitor the angle of the corner arm steerable wheels.

6 Claims, 2 Drawing Sheets

CORNER IRRIGATION SYSTEM INCLUDING A GPS GUIDANCE SYSTEM

BACKGROUND OF THE INVENTION

1. Field of the Invention

This invention relates to a center pivot irrigation system having the ability to irrigate the corners of the field being irrigated. More particularly, this invention relates to an improved means for guiding the movement of the corner span with respect to the center pivot portion of the system which includes a GPS guidance system.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of pipes connected together in an end-to-end fashion which are supported upon a plurality of drive towers. In most conventional center pivot irrigation systems, the outermost drive tower is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517; 3,802,726; and 3,902,668. Corner systems usually consist of an extension boom or arm, sometimes referred to as a corner span, which is pivotally connected to the outer end of the main boom and which is supported on at least one steerable drive tower. A guidance system is provided for guiding or steering the extension tower, and extension boom, out into the corners of the field as the main arm travels around the field. Perhaps the most popular method of guiding the extension tower is the buried wire system described in U.S. Pat. No. 3,902,668. However, many different types of systems for driving and steering the wheels of the extension tower have been previously provided. See, for example, U.S. Pat. Nos. 4,508,269 and 4,674,681.

Although the prior art systems do perform generally satisfactorily to drive and steer the extension booms, it is believed that the instant invention, utilizing a GPS guidance system, is more reliable and is more accurate than the prior art systems.

SUMMARY OF THE INVENTION

A self-propelled irrigation system is disclosed which includes an elongated main boom pivoted at one end to a center pivot apparatus and being supported on a plurality of self-propelled, non-steerable drive towers, with an extension boom pivotally secured to the other end of the main boom for irrigating corner areas of the field. A steerable drive tower supports the extension boom and includes a pair of steerable wheels. Means is provided for steering the steerable drive wheels for guiding the steerable drive tower along a preselected path, thereby causing the pivotal extension of the extension boom into the corner areas of the field as the main boom approaches the same and pivotal retraction of the extension boom out of the corner areas of the field as the main boom departs the same. A control means is provided for steering the drive wheels of the steerable drive towers. The control means includes a GPS receiver means and a computer means for receiving and processing GPS information as to the location of the main boom and for determining the optimal steer angle for the steerable drive wheels for the current position of the main boom and for positioning the steerable drive wheels in the optimal steer angle. GPS receivers are located at the center pivot and at the steerable drive tower. As the main boom pivots, position information is used by the computer means to determine an accurate steerable drive tower position relative to the pivot position of the main boom.

Therefore, it is a principal object of the invention to provide a corner irrigation system including a GPS guidance system.

A further object of the invention is to provide a corner irrigation system including a GPS receiver means and a computer means for receiving and processing GPS information as to the location of the main boom and for determining the optimum steer angle for the steerable drive wheels of the extension boom for the current position of the main boom and for positioning the steerable drive wheels in the optimal steer angle.

A further object of the invention is to provide a system of the type described which utilizes GPS guidance means to accurately position the extension boom with respect to the main boom and all positions of the main boom relative to the center pivot.

These and other objects will be apparent to those skilled in the art.

DESCRIPTION OF THE PREFERRED EMBODIMENT

Figure 1:
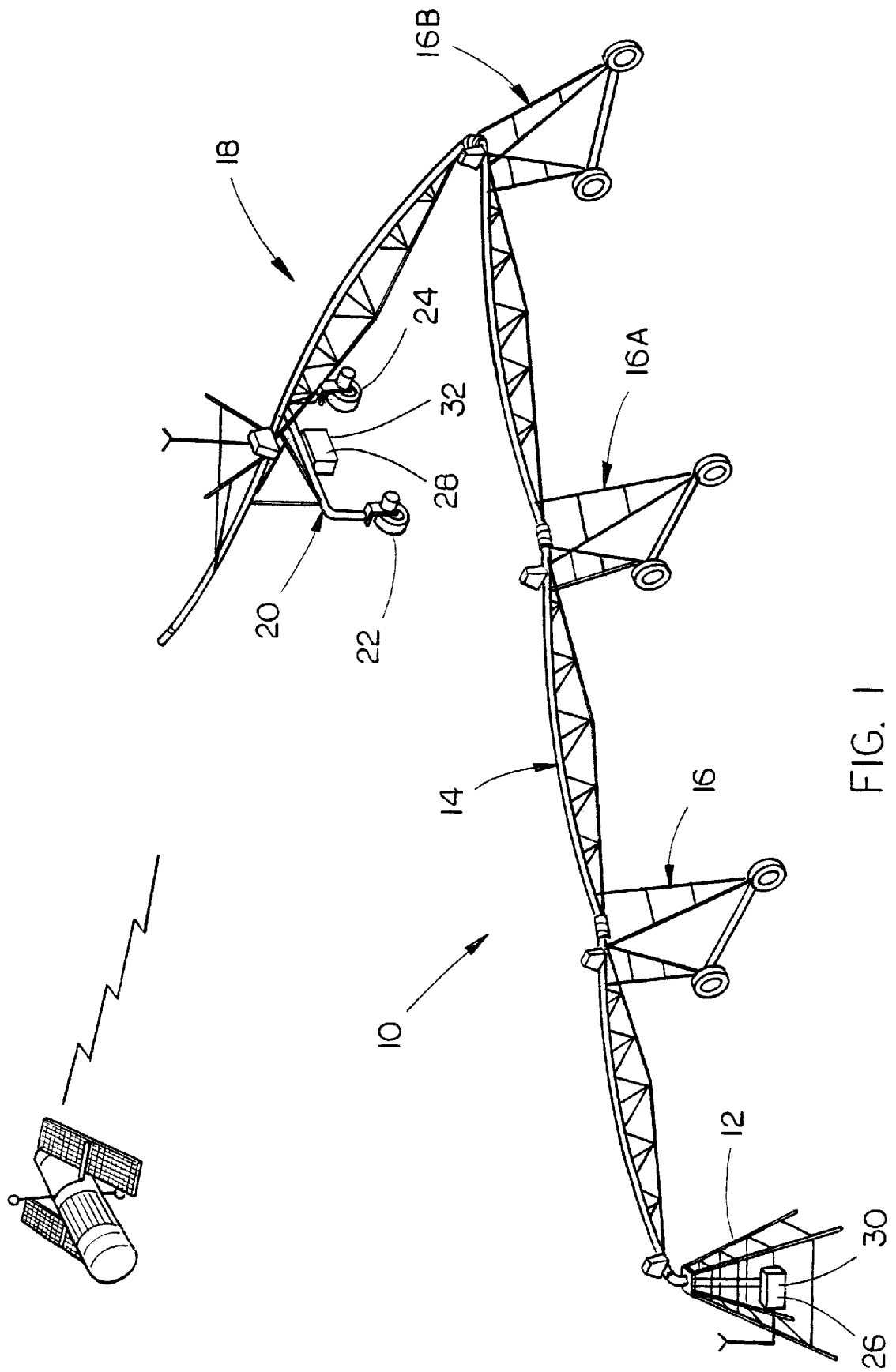
FIG. 1 is a perspective view illustrating the corner irrigation system of this invention.
Figure 2:
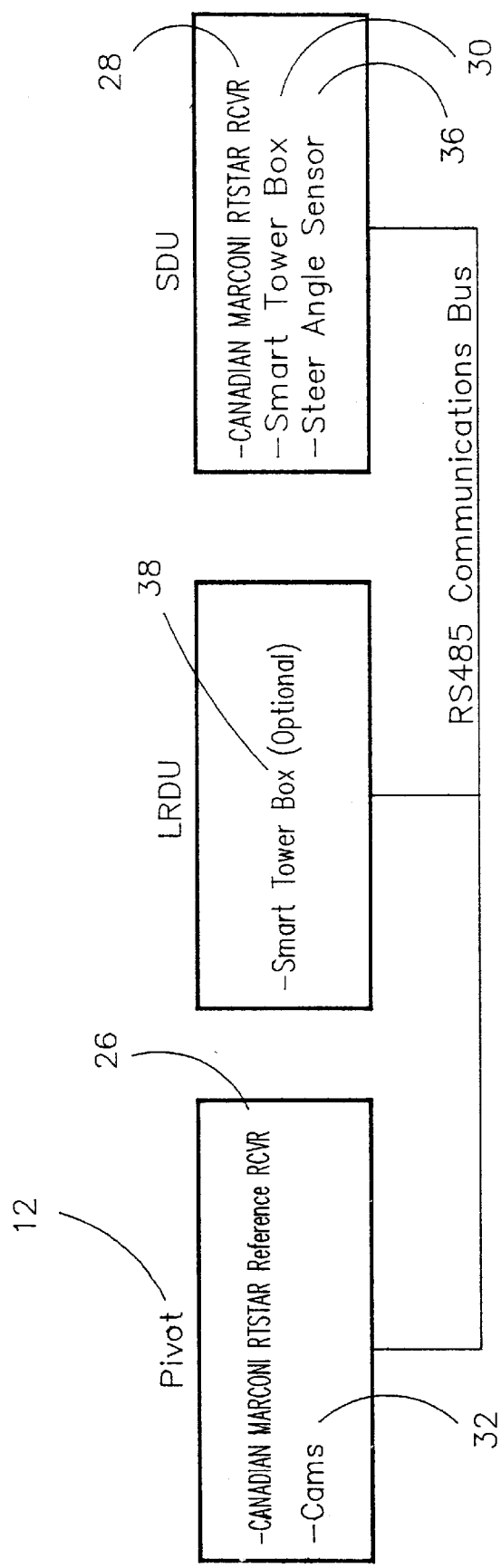
FIG. 2 is a block diagram of the GPS instrumented corner guidance system of this invention.

The self-propelled irrigation system or corner irrigation system of this invention is illustrated in FIG. 1 and is generally designated by the reference numeral 10. System 10 includes a conventional center pivot structure 12 having a main boom 14 pivotally secured thereto and extending outwardly therefrom and which is supported by a plurality of non-steerable drive towers 16, 16A, and 16B which is the last regular drive unit (LRDU). Although only three drive towers 16 are illustrated, the main boom 14 could utilize any number of drive towers. The numeral 18 refers to an extension boom or corner span which is pivotally connected at its inner end to LRDU 16B and which is supported upon a steerable drive tower or unit 20 (SDU) having a pair of steerable wheels 22 and 24 which are steered by an electric motor in conventional fashion except for the control or guidance means. Normally, the current method for controlling the extension and retraction of the corner span or extension boom 18 relies on sensing the electric field generated by a cable buried along the desired path of the SDU 20, on a corner arm equipped center pivot irrigation system such as disclosed in U.S. Pat. No. 3,902,668. With this approach, an oscillator at the pivot 12 is used to create a low frequency signal in a buried cable with an antenna and signal processing electronics being mounted on the SDU to detect the electric field radiated from the buried cable and determine the appropriate steer angle of the SDU wheels 22 and 24 which will keep the SDU 20 over the top of the buried cable. Cable and installation expenses as well as servicing cable breaks are disadvantages of this method. It is to this conventional corner arm equipped center pivot irrigation system that the GPS guidance system of this invention is utilized.

In this invention, a guidance and control system providing accurate navigation of a center pivot irrigation corner arm has been developed using GPS receivers as position sensors. The system is comprised of two GPS units (receiver and antenna), two microprocessor based "smart boxes", a communications link (typically hard-wired RS-485 differential bus running from pivot 12 to SDU 20), and an angle sensor to monitor the angle of the corner arm steerable wheels. More particularly, the numeral 26 refers to a GPS receiver located at the pivot structure 12 which is preferably a Canadian Marconi RTSTAR Reference RCVR while the GPS receiver 28 at the SDU 20 is preferably a Canadian Marconi RTSTAR Mobile RCVR. The computer 30 at the pivot 12 is operatively interconnected to the GPS receiver 26 in conventional fashion. Preferably, the GPS receiver 28 is interconnected to the smart tower box 38 which is connected to the steering angle sensor 36 of conventional design. Smart tower box 38 is optional and may be located at the LRDU 16B.

The stationary "base" GPS receiver 26 is programmed with approximate reference coordinates. Precise coordinates from a geodetic survey are not required, since all required position information is relative—between the two GPS receivers 26 and 28—not absolute with the center of the earth as a reference. As the base GPS receiver 26 computes a new coordinate each second (using information provided by an orbiting GPS satellite), it compares the computed coordinates with the reference coordinates to determine the error in the immediate code and carrier phase GPS signals. This error is then transmitted to the smart box 32 at the corner arm steerable drive unit 20. The "smart box" 32 immediately sends this data to a communications port such as the auxiliary communications port of the "roving" GPS receiver 28. With this correction data, the roving GPS receiver 28 is able to determine the position of its antenna relative to the antenna of the base receiver 26 with the accuracy of 10–20 cm. Using this position information, the "roving" computer 32 translates the global coordinates to local coordinates and determines the relative distance and angle of the SDU 20 to the pivot 12. With this distance and angle information, the smart box 32 at the SDU 20 determines the appropriate steer angle of the steerable wheels 22 and 24 and controls them accordingly. Determining the appropriate steer angle involves a software look-up table containing ideal pivot-SDU distances based on pivot-SDU angles from 0.0 to 359.9. The difference between the computed pivot-SDU distance and the ideal pivot-SDU distance (corresponding to the current pivot-SDU angle) is used as an error term in a PI (proportional-integral) control loop used to steer the wheels 22 and 24.

The software look-up table is specific to each field and is determined during a single revolution of the system. During this revolution, the smart box 32 and the GPS unit 28 that are located at the SDU 20 in normal operation will be placed at the LRDU 16B to determine the pivot-LRDU distance at each LRDU angle location. This is important because field topology greatly affects the relative horizontal pivot-LRDU distance which is used in determining an ideal SDU path. At the completion of the revolution, the "roving" smart box 32 or a personal computer will use the acquired position data to generate the software look-up table. This table is generated using the following information: pivot-LRDU distance at each 0.1 degree position; corner arm length dry (i.e., no water in system); corner arm length wet; maximum north, south, east, west field dimensions; and maximum and minimum allowable corner angle. Further, position data for any obstacles in the field (e.g., barn or house) would also need to be provided. In some situations, it may be important to perform an initial revolution in the forward and reverse directions to adequately develop a software lookup table.

Thus, as the main boom moves through the field, the guidance system of this invention will adjust the steering angle of the SDU 20 to properly position the extension boom with respect to the main boom for every position of the main boom with respect to the field.

Thus it can be seen that the guidance system of this invention therefore achieves all of its stated objectives

We claim:

1. A self-propelled irrigation machine having an elongated main boom pivoted at one end to a center pivot apparatus and mounted on a plurality of self-propelled, non-steerable drive towers, an extension boom pivotally secured to the other end of the main boom for irrigating corner areas of the field, a steerable drive tower supporting said extension boom including a pair of steerable drive wheels, the improvement comprising:

means for steering said steerable drive wheels for guiding said steerable drive tower along a preselected path thereby causing the pivotal extension of said extension boom into the corner areas of the field as said main boom approaches the same and pivotal retraction of said extension boom out of the corner areas of the field as said main boom departs the same;

control means for controlling the operation of said means for steering said steerable drive wheels;

said control means including a GPS receiver means and a computer means for receiving and processing GPS information as to the location of said main boom and for determining the optimal steer angle for said steerable drive wheels for the current position of said main boom and for positioning said steerable drive wheels in the optimal steer angle.

2. The self-propelled irrigation machine of claim 1 wherein said GPS receiver means comprises a first GPS receiver located at the center pivot and a second GPS receiver located on said steerable drive tower.

3. The self-propelled irrigation machine of claim 2 wherein said computer means includes a software based look-up table containing the ideal steerable drive tower path.

4. The self-propelled irrigation machine of claim 3 wherein said computer means is located at said center pivot.

5. The self-propelled irrigation machine of claim 3 wherein said computer means is located at said steerable drive tower.

6. The self-propelled irrigation machine of claim 3 wherein position information obtained from said GPS receiver means, which are located at said center pivot and said steerable drive tower, as said main boom pivots, is used by said computer means to determine an accurate steerable drive tower position relative to the pivot position of the main boom.

* * * * *